UNITED STATES PATENT OFFICE.

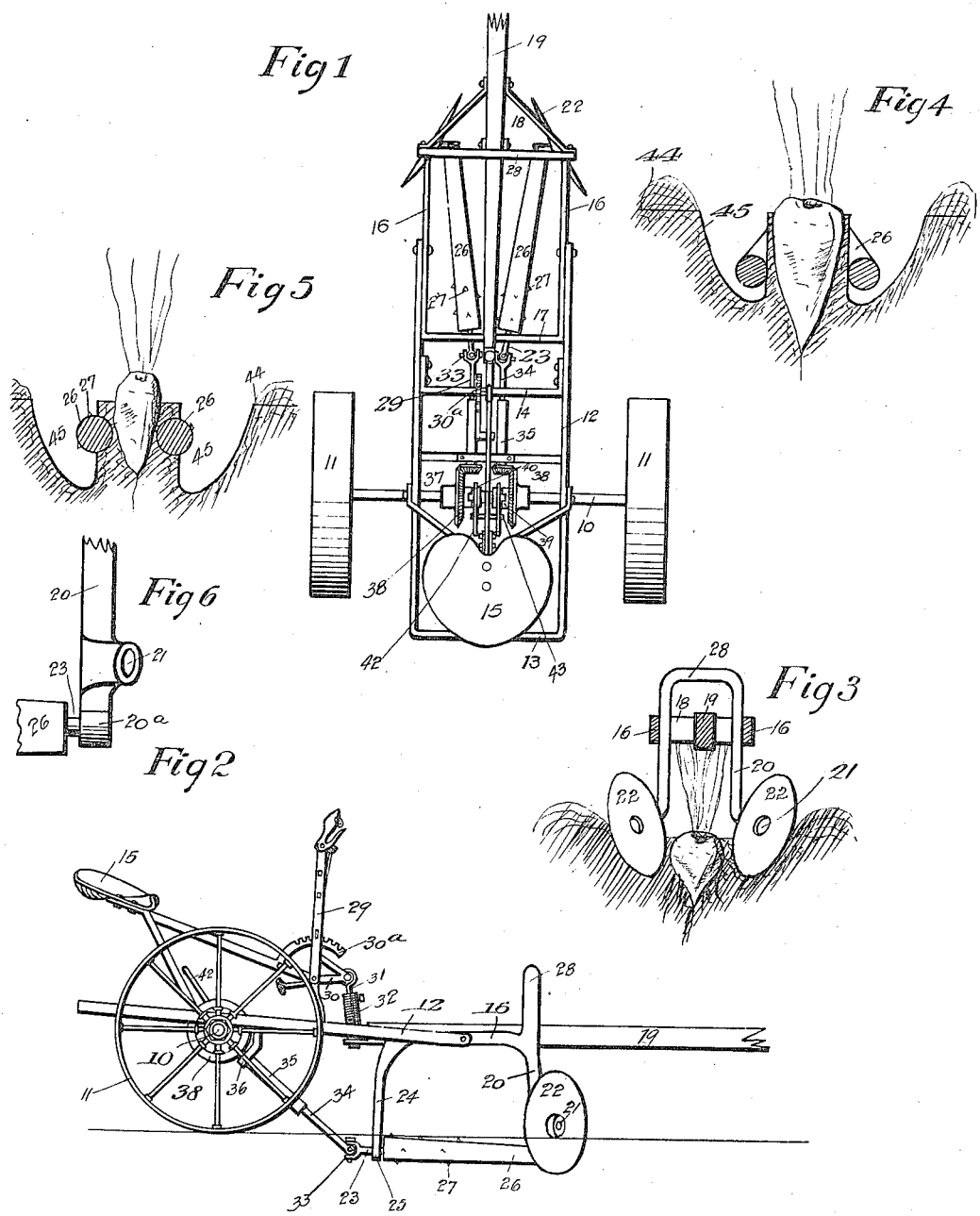

CHRISTIAN C. MOLLER AND JENS J. BOLLERUP, OF AUDUBON, IOWA.

BEET-HARVESTER.

1,155,319.   Specification of Letters Patent.   Patented Sept. 28, 1915.

Application filed May 4, 1914.   Serial No. 836,383.

*To all whom it may concern:*

Be it known that we, CHRISTIAN C. MOLLER and JENS J. BOLLERUP, citizens of the United States, and residents of Audubon, in the county of Audubon and State of Iowa, have invented a certain new and useful Beet-Harvester, of which the following is a specification.

The object of our invention is to provide a beet harvester of simple, durable and inexpensive construction.

More particularly, it is our object to provide a machine of the type mentioned having mechanism adapted to cut a furrow on each side of a row of beets, and having means for then lifting the beets from the ground and dropping them substantially free from dirt.

Our invention consists in certain details, in the construction, combination and arrangement of the various parts of the device, whereby the objects contemplated are attained, as hereinafter more fully set forth, pointed out in our claims, and illustrated in the accompanying drawing, in which:

Figure 1 shows a top or plan view of a beet harvester, embodying our invention. Fig 2 shows a side elevation of the same. Fig. 3 shows a front elevation of the forward portion of the frame, the rear part of the machine being omitted for the sake of clearness. Fig. 4 shows a vertical, transverse, sectional view through a section of ground, illustrating the manner in which the ditches are cut on each side of the row of beets, and showing the location of the beet lifting rollers, where the beet is of large size. Fig. 5 shows a similar view, illustrating the action of the machine on the smaller beets, and Fig. 6 shows a detail view of part of the machine.

It will be understood that our device is designed particularly for use in harvesting beets.

In the accompanying drawing, we have used the reference numeral 10 to indicate the axle of the machine, on which are the wheels 11. Mounted on the axle 10 is a frame which includes the parallel, longitudinal members 12, the rear, transverse member 13, and the forward transverse member 14. The members 12 extend forwardly beyond the member 14. Mounted on the frame is a seat 15.

We provide what we shall call a second frame, comprising the parallel, longitudinal side members 16, the rear transverse member 17 and the forward transverse members 18. The members 16 are pivoted at points between their ends to the forward ends of the members 12, as clearly shown in Fig. 1. The tongue 19 is fixed to the transverse members 18 and extends rearwardly in the machine and also forwardly from the machine from said members. Extending downwardy from the forward end of the second frame, at each side thereof, is an arm 20, on the lower end of which is formed a laterally extending spindle 21, on which is rotatably mounted a disk 22. The disks 22 are suitably inclined to cut parallel grooves or ditches in the surface of the ground. The arms 20 extend above the frame members 16 and are connected at their upper ends by a transverse member 28. On the lower end of each arm 20 is a bearing 20ª, in which is rotatably mounted a shaft 23. The shafts 23 are extended rearwardly in the machine and incline toward the middle thereof. Extending downwardly from the cross member 17 are arms 24, which form at their lower ends bearings 25 for the rear ends of the shafts 23. Mounted on the shafts 23 are rollers 26, which are somewhat tapered from their larger rear ends to their smaller forward ends. On account of the arrangement of the shafts 23 the rear ends of the rollers 26 are closer together than their forward ends. Formed on the rear ends of the rollers 26 are lugs or projections 27. Mounted on the main frame is a lever 29, adjacent to a sector 30ª, and provided with an ordinary spring controlled pawl, designed to coact with said sector. The lever 29 is provided near its lower end with a forwardly extending arm 30. The arm 30 is yieldingly connected with the rear end of the tongue 19 by means of a rod 31 and spring 32. Connected with the rear end of each shaft 23, by means of a universal joint 33, is an upwardly and rearwardly extending shaft 34, preferably angular in cross section, and slidably received in the lower end of the hollow shaft 35, having an angular opening therein. The rear upper end of the shaft 35 is suitably mounted in a bearing 36 and carries a beveled gear 37. Rotatably but non-slidably mounted on the axle 10 are beveled gears 38, spaced from each other and in mesh with the beveled gears 37 on the respective shafts 35. Formed on the adjacent faces of the gears 38 are clutch members 39. Slidably but non-rotatably mounted on the axle 10, between the gears 38, are clutch members 40, designed to coact with the respective clutch members 39. The clutch members 40 are controlled by levers 42, pivoted between their ends to the frame member 43.

In the practical operation of our improved beet harvester, assuming that the machine is in the field, the lever 29 is moved to position for lowering the rear end of the tongue and thereby lowering the second frame and the disks and beet rollers 26. The machine is driven forward with the disks 22 on the opposite sides of the row of beets. In Figs. 4 and 5, we have shown by the line 44 the normal surface of the ground in which the disks cut the channels or furrows 45, spaced from each other on opposite sides of the row of beets, the disks being arranged to throw the surplus dirt away from the row. As shown in Fig. 1, the rollers 26 incline from their forward ends rearwardly and inwardly. The rollers 26 travel in the furrows 45 and large beets are engaged by the rollers near their forward ends. The rollers are so carried that their adjacent faces rotate upwardly so that the beets when engaged by the rollers will be thrown upwardly and dropped loosely on the ground. In the case of smaller beets, the rollers will enter the rigid ground between the furrows 45, as shown in Fig. 5, and the rearward portions of the rollers will engage the beets and lift them up. For the comparatively small beets, the lugs 27 serve to insure the removal of the crop from the ordinary soil. The rollers 26 are made of comparatively soft material so as to do the minimum injury to the beets.

It will readily be seen that the beets will not be cut or seriously bruised where a machine of this type is employed in removing them from the ground.

We realize that some changes may be made in the details of the construction of our beet harvesting machine and we intend to cover by this application any such changes as may be included within the scope of the following claims:

We claim as our invention:

1. In a device of the class described, a second frame, a first frame tiltably mounted with relation thereto, furrow opening devices carried by said second frame and adapted to open parallel furrows on opposite sides of a row of beets or the like, rollers mounted rearwardly of the furrow opening devices substantially horizontally, said rollers being gradually increased in their size from their forward to their rearward ends, the forward ends of said rollers traveling in said furrows while their rearward ends are inclined toward each other, gripping devices on said rollers, traction wheels on the first frame, and means for imparting movement from the traction wheels to the rollers in any of the relative positions of the frames.

2. In a device of the class described, a second frame, a first frame tiltably mounted with relation thereto, traction wheels supporting said first frame, opposite downwardly extending arms on the second frame, rotary furrow opening means on the lower ends of said arms, opposite downwardly extending arms on the rear portion of said second frame arranged in alinement longitudinally of the machine with the respective first described downwardly extending arms, rollers arranged longitudinally of the machine and rotatably mounted in said downwardly extending arms and adapted to travel in the furrows opened by said furrow opening devices, and to engage beets and the like of different sizes in the space between the furrows for pulling them out of the ground, and means for imparting rotation to the rollers from said wheels in any of the relative positions of the arms.

Des Moines, Iowa, April 9, 1914.

CHRISTIAN C. MOLLER.
JENS J. BOLLERUP.

Witnesses:
PETER LYKKE,
GEORGE S. FAABORG.